Patented May 30, 1933

1,912,296

UNITED STATES PATENT OFFICE

FRIEDRICH MUTH, OF LEVERKUSEN-I. G. WERK, AND KARL PAUL GRÄLERT, OF WUPPERTAL-ELBERFELD, GERMANY, ASSIGNORS, BY MESNE ASSIGNMENTS, TO GENERAL ANILINE WORKS, INC., OF NEW YORK, N. Y., A CORPORATION OF DELAWARE

TIN-CONTAINING THIOPHENOLS

No Drawing. Application filed December 3, 1931, Serial No. 578,848, and in Germany December 15, 1930.

The present invention relates to a process of preparing complex tin compounds from sulfurized phenols and to the new compounds obtainable thereby.

Non-dyeing sulfurized derivatives of phenols serving as mordants for basic dyestuffs are known in literature. Such compounds are described, for example, in U.S. Patent 1,450,463, Reissue-Patent 17,940, in British Patents 173,313, 211,108, 215,012 and French Patent 575,652.

These thio derivatives of phenols are obtainable by heating phenolic compounds free from nitrogen with sulfur in the presence of an alkali metal oxide or an alkaline earth metal oxide, or in the presence of a suitable catalyst, such as sodium nitrite, iodine, and, if desired, in the presence of water or another solvent or diluent, preferably an excess of the starting phenol being used as solvent.

In the annexed claims the sulfurized phenols of the kind stated and used as starting material in this process are designated as "non-dyeing high molecular sulfurized phenols".

As starting phenolic compounds free from nitrogen there may be mentioned by way of example phenol, naphthol, hydroxydiphenyl compounds in which the two nuclei may be linked together either directly by a carbon-carbon linkage or by means of a bridge, as —CH$_2$—, —S—, —S—S—. In all these phenolic compounds the nuclei may be substituted, for example by halogen, alkyl, hydroxy, sulfonic- and carboxylic acid groups, but nitrogen containing substituents, such as the nitro- or amino group are excluded, because otherwise these phenolic compounds would react with the formation of sulfur dyestuffs.

In accordance with the present invention, new complex tin compounds of sulfurized phenols are prepared by melting a sulfurized phenolic compound of the kind referred to above with a phenolic compound free from nitrogen and with the addition of a water soluble tin compound.

As suitable tin compounds coming into consideration for the purpose of the invention, there may be mentioned by way of example, alkali metal stannates, alkali metal sulfostannates, the tin salt of oxalic acid, or compounds containing tin in a complex form, such as alkali metal tin oxalates, alkali metal salts of hexachlorostannic acid (Me$_2$SnCl$_6$).

Instead of starting with a water soluble tin compound, the latter may be produced in the reaction mixture from a suitable water insoluble tin compound, for example, by introducing stannic or stannous chloride or tin into the reaction mixture containing aqueous caustic soda lye, whereby the water soluble sodium stannate is formed.

The ratio of the sulfurized phenol to phenol may be varied within the widest limits, but generally we are starting with a mixture containing ½ to 1 part by weight of phenol for 1 part by weight of sulfurized phenol. When working with an excess of phenol the excess phenol remains unchanged and may be removed by distilling directly in a vacuo or with steam. The quantity of the tin compound required for performing the reaction somewhat depends on the specific sulfurized phenol used, but as a general rule, there can be stated that about 5 to 20% of tin in form of a water soluble compound, calculated on the starting sulfurized phenol, must be used. Favorably such a quantity of tin compound is used that the final product has a tin content of about 10 to 15%.

We wish it to be understood that the invention is not restricted to the limits heretofore given with regard to the ratio of sulfurized phenol to phenol to tin compound.

The temperature at which the process can be carried out varies between the melting temperature of the mixture and the boiling temperature of the same, both limits being included. If desired, it may be performed with the addition of water. It is complete when a test portion, dissolved in a rather large quantity of water, is no longer precipitated by the addition of acetic acid, generally several hours, for example, 1 to 8 hours, are necessary for completing the reaction.

Our new complex tin compounds of sulfurized phenols are generally light greyish to brownish substances, in the form of their alkali metal salts they are soluble in water from which solutions they are not reprecipitated by the addition of acetic acid, but are precipitated by the addition of a mineral acid; contrary thereto the sulfurized phenols are already precipitated from their aqueous solutions by the addition of acetic acid. The free resinous acid precipitated by the addition of a mineral acid is insoluble in water, soluble in acetone.

From our present knowledge we are not able to say how the reaction proceeds, but probably the high molecular sulfurized phenol reacts with the phenol, sulfurizing the same. The tin compound probably takes part in the reaction with the formation of a complex tin acid.

The new complex tin compounds of sulfurized phenols are valuable mordants possessing the property of becoming fixed from their aqueous solutions on cellulosic fibres and of fixing basic dyestuffs thereon. Further they possess the property of reserving wool from taking up acid and neutral dyestuffs in the dyeing of mixed fabrics.

The invention is illustrated by the following examples, without being limited thereto:

*Example 1.*—94 parts by weight of phenol, 15.5 parts by weight of caustic soda, 40 parts by weight of water and 60 parts by weight of sulfur are melted together for 4–6 hours at a temperature of 125° C. and the sulfurized phenol condensation product is isolated in the known manner.

100 parts by weight of this product are introduced into 100 parts by weight of molten phenol and after the addition of 45 parts by weight of sodium stannate the mixture is melted for about 4 hours at a temperature of 130° C. In order to keep the melt fluxed suitably, about 25 parts by weight of water are added in small portions. The product is dried by heating in a vacuo without further purification. After pulverizing a grey powder possessing the property of reserving wool to a high degree in the dyeing of mixed fabrics is obtained.

Instead of the above described sulfurized phenol condensation product also other sulfurized phenols can be used, e. g. products obtainable in accordance with British Specification No. 173,313. Also mixtures of different sulfurized phenols and/or of different phenols can be used.

The phenol-sulfuric resin mentioned in Monatshefte für Chemie, vol. 4, (1883), page 166, is likewise suitable for the said purpose.

Instead of phenol also derivatives thereof or naphthols can be used. Thus, for example, by melting 100 parts by weight of the sulfurized phenol, obtained in accordance with the example of British Specification No. 173,313, together with 100 parts by weight of chlorophenol or 100 parts by weight of paracresol and 56 parts by weight of sodium stannate a greyish stanniferous powder results on working in an analogous manner.

*Example 2.*—Into a melt of 90 parts by weight of phenol and a solution of caustic soda containing 12 parts by weight of sodium hydroxide and 40 parts by weight of water, 60 parts by weight of sulfur are introduced and melted for 5–6 hours at a temperature of 117° C. The melt produced is worked up in the customary manner, for example, it is dried by heating in vacuo.

The sulfurized phenol condensation product obtained is melted together with 50 parts by weight of phenol for 2 hours, and a solution of 28 parts by weight of caustic soda in 40 parts by weight of water is added slowly. Then the mixture is melted together for a short time, and within 1 hour 40 parts by weight of crystallized stannous chloride are added, and after heating to about 120–125° C., the mixture is melted for a further 4 hours. The melt is pulverized.

A weak yellowish brown powder possessing strong wool reserving properties is thus obtained.

*Example 3.*—20 parts by weight of a sulfurized phenol condensation product, obtained by melting phenol, milk of lime and sulfur and subsequent converting into the sodium salt, are introduced into 20 parts by weight of molten phenol and 5 parts by weight of water. Within 1 hour 9 parts by weight of sodium stannate are introduced, and the whole is melted together for a few hours, say about 4 hours, at a temperature of about 112° C. The mixture obtained is dried by heating in a vacuo.

A weak grey powder possessing strong wool reserving properties is thus obtained. Instead of the sodium stannate, also other soluble tin salts can be used, e. g. 13.5 parts of tin potassium chloride or 12.5 parts by weight of tin potassium oxalate.

Instead of phenol also a phenol derivative, naphthol or a mixture of both can be used. Thus, for example, 20 parts by weight of the sulfur condensation product with 20 parts by weight of para-chloro-phenol, or 20 parts by weight of β-naphthol and 12 parts by weight of sodium stannate yield similar products when heated to a temperature of 115° C.

Instead of the sulfurized phenol condensation product from phenol, also the products obtained from phenol derivatives, naphthols or mixtures thereof can be used; for example, a product which is obtained by melting together 94 parts by weight of phenol, 144 parts by weight of β-naphthol, 56 parts by weight of calcium oxide, 160 parts by weight of sulfur and 350 parts by weight of water, or 128.5 parts by weight of parachlorophenol, 28 parts by weight of lime, 80 parts by weight of sulfur and 50 parts by weight of water.

*Example 4.*—50 parts by weight of the sodium salt of a sulfurized phenol condensation product, obtained by melting together phenol, sulfur and milk of lime, are introduced into 35 parts by weight of molten phenol and melted for 1 hour at a temperature of 125–130° C. Then a solution of 6.4 parts by weight of sodium hydroxide in 10 parts by weight of water is added and melted for 2 hours at a temperature of 120° C. After that time, 10.4 parts by weight of tin tetrachloride are added and the mixture is melted for 3 further hours. The melt is dried by heating in vacuo. A weak yellowish grey powder possessing good reserving properties is thus obtained.

*Example 5.*—20 parts by weight of a sulfurized phenol condensation product, obtained by melting together 190 parts by weight of phenol and 160 parts by weight of sulfur, 150 parts by weight of water and a mixture of 28 parts by weight of calcium oxide with 21 or 40 parts by weight of caustic soda, are melted together with phenol and tin in an analogous manner. The products obtained possess strong wool reserving properties.

The process can also be carried out in such a manner that different sulfurized phenol condensation products are mixed and melted together with phenols and tin salts. Thus, for example, 15 parts by weight of a product obtained from phenol, sulfur and calcium oxide, and 10 parts by weight of a product obtained by melting together 188 parts by weight of phenol, 20 parts by weight of caustic soda and 130 parts by weight of sulfur at a temperature of 170–180° C. are melted together with the same quantity of phenol and 10 parts by weight of sodium stannate for 6 hours at a temperature of 122° C.

The product thus obtained displays good wool reserving properties.

*Example 6.*—15 parts by weight of the sulfurized phenol condensation product employed as starting material in example 5 are dissolved in 200 parts by weight of water, 25 parts by weight of phenol are added and into the boiling solution 15 parts by weight of technical sodium stannate are introduced. After about 4–6 hours boiling at a temperature of 104° C. the melt is evaporated. A weak yellowish brown colored product, possessing strong wool reserving properties is thus obtained.

We claim:

1. The process which comprises heating for several hours a non-dyeing high molecular sulfurized phenol, a phenolic compound free from nitrogen and a water soluble tin compound at a temperature between the melting point of the reaction mixture and the boiling point of the same.

2. The process which comprises heating for several hours a non-dyeing high molecular sulfurized phenol, a phenolic compound free from nitrogen and a water soluble tin compound at a temperature between the melting point of the reaction mixture and the boiling point in the presence of a solvent.

3. The process which comprises heating for several hours a non-dyeing high molecular sulfurized phenol, a phenolic compound free from nitrogen and a water soluble tin compound at a temperature between the melting point of the reaction mixture and the boiling point of the same in the presence of water.

4. The process which comprises heating for several hours a non-dyeing high molecular sulfurized phenol, phenol and sodium stannate at a temperature between the melting point of the reaction mixture and the boiling point of the same.

5. The process which comprises heating for several hours a non-dyeing high molecular sulfurized phenol, phenol and sodium stannate at a temperature between the melting point of the reaction mixture and the boiling point of the same in the presence of water.

6. The process which comprises heating a mixture consisting of 1 part by weight of a non-dyeing high molecular sulfurized phenol, 0.5 to 1 part by weight of a phenolic compound free from nitrogen and a water-soluble tin compound in a quantity corresponding to 5 to 20% of tin, calculated on the quantity of the sulfurized phenol, at a temperature between the melting and boiling point of the mixture, until a test portion dissolved in a rather large quantity of water is no longer precipitated by the addition of acetic acid.

7. The process which comprises heating a mixture consisting of 1 part by weight of a non-dyeing high molecular sulfurized phenol, 0.5 to 1 part by weight of a phenolic compound free from nitrogen and a water-soluble tin compound in a quantity corresponding to 5 to 20% of tin, calculated on the quantity of the sulfurized phenol, at a temperature between the melting and boiling point of the mixture in the presence of water, until a test portion dissolved in a rather large quantity of water is no longer precipitated by the addition of acetic acid.

8. The process which comprises heating a mixture consisting of 1 part by weight of a non-dyeing high molecular sulfurized phenol, 0.5 to 1 part by weight of phenol and a water soluble tin compound in a quantity corresponding to 5 to 20% of tin, calculated on the quantity of the sulfurized phenol, at a temperature between the melting and boiling point of the mixture, until a test portion dissolved in a rather large quantity of water is no longer precipitated by the addition of acetic acid.

9. The process which comprises heating a mixture consisting of 1 part by weight of a non-dyeing high molecular sulfurized phenol, 0.5 to 1 part by weight of phenol and a water-soluble tin compound in a quantity corresponding to 5 to 20% of tin, calculated on the quantity of the sulfurized phenol, of tin in form of sodium stannate at a temperature between the melting and boiling point of the mixture in the presence of water, until a test portion dissolved in a rather large quantity of water is no longer precipitated by the addition of acetic acid.

10. The process which comprises heating 100 parts by weight of a sulfurized phenol obtained by melting together for 4 to 6 hours 94 parts by weight of phenol, 15.5 parts by weight of caustic soda, 40 parts by weight of water and 60 parts by weight of sulfur at a temperature of 125° C. with 100 parts by weight of phenol and 45 parts by weight of sodium stannate and heating for about 4 hours at a temperature of 130° C., thereby introducing to the melt in small portions about 25 parts by weight of water.

11. The process which comprises melting together a sulfurized phenol, obtainable by heating 90 parts by weight of phenol, 12 parts by weight of sodium hydroxide, 60 parts by weight of sulfur and 40 parts by weight of water for 5 to 6 hours at 117° C., with 50 parts by weight of phenol for 2 hours, slowly introducing a solution of 28 parts by weight of caustic soda and 40 parts by weight of water, melting together the mixture for a short time, introducing within 1 hour 40 parts by weight of crystallized stannous chloride and heating the mixture at 120–125° C. for 4 hours.

12. As new products tin complex compounds for non-dyeing high molecular sulfurized phenols, obtainable in accordance with the process of claim 1, being generally light greyish to brownish powders, forming water-soluble alkali metal salts, being valuable mordants, and possessing the property of reserving wool from taking up acid and neutral dyestuffs in the dyeing of mixed fabrics.

13. As new products tin complex compounds from non-dyeing high molecular sulfurized phenols, obtainable in accordance with the process of claim 4, being generally light greyish to brownish powders, forming water-soluble alkali metal salts, being valuable mordants, and possessing the property of reserving wool from taking up acid and neutral dyestuffs in the dyeing of mixed fabrics.

14. As new products tin complex compounds from non-dyeing high molecular sulfurized phenols obtainable in accordance with the process of claim 6, being generally light greyish to brownish powders, forming water-soluble alkali metal salts, being valuable mordants, and possessing the property of reserving wool from taking up acid and neutral dyestuffs in the dyeing of mixed fabrics.

15. As new products tin complex compounds from non-dyeing high molecular sulfurized phenols, obtainable in accordance with the process of claim 8, being generally light greyish to brownish powders, forming water-soluble alkali metal salts, being valuable mordants, and possessing the property of reserving wool from taking up acid and neutral dyestuffs in the dyeing of mixed fabrics.

16. As a new product a tin complex compound from non-dyeing high molecular sulfurized phenols, obtainable in accordance with the process of claim 10, being a light greyish powder, forming water-soluble alkali metal salts, being a valuable mordant, and possessing the property of reserving wool from taking up acid and neutral dyestuffs in the dyeing of mixed fabrics.

17. As a new product a tin complex compound from non-dyeing high molecular sulfurized phenols, obtainable in accordance with the process of claim 11, being a light greyish powder, forming water-soluble alkali metal salts, being a valuable mordant, and possessing the property of reserving wool from taking up acid and neutral dyestuffs in the dyeing of mixed fabrics.

In testimony whereof, we affix our signatures.

FRIEDRICH MUTH.
KARL PAUL GRÄLERT.